No. 690,504. Patented Jan. 7, 1902.
C. WURSTER.
HOPPER FOR REFINING ENGINES.
(Application filed May 25, 1901.)
(No Model.)
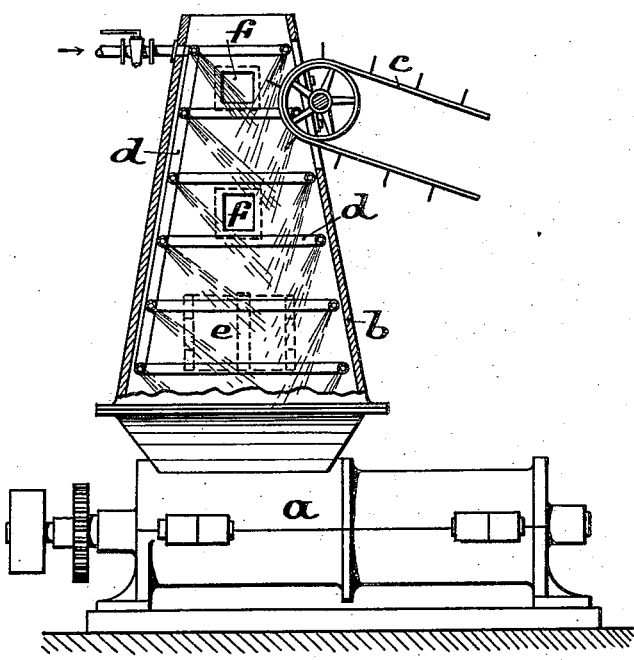
WITNESSES
INVENTOR
Casimir Wurster
by ATTORNEYS

UNITED STATES PATENT OFFICE.

CASIMIR WURSTER, OF LONDON, ENGLAND.

HOPPER FOR REFINING-ENGINES.

SPECIFICATION forming part of Letters Patent No. 690,504, dated January 7, 1902.

Application filed May 25, 1901. Serial No. 61,846. (No model.)

*To all whom it may concern:*

Be it known that I, CASIMIR WURSTER, a subject of the Emperor of Germany, residing at Dudley Mansion, 29 Abbey road, St. John's Wood, London, England, have invented certain new and useful improvements in hoppers for receiving goods transported by compressed air, which are likely to clog up the ordinary funnel-shaped hoppers; and I do hereby declare the following to be a full, clear, and exact description of the invention, such as will enable others skilled in the art to which it appertains to make and use the same.

The present hoppers put over the openings of pulping-machines in which the material is to be received or pulped up—such as paper in pieces, cut rags, paper-pulp, and other materials, and to which the said materials are conveyed by means of an endless traveling band or by tubing and compressed air or even when it is necessary to simply throw down the paper-stock straight into the pulping-machine from a higher story to a lower one—often clog up as the material lodges in the narrower parts of the funnel-shaped hoppers, which causes irregular work and great annoyance.

The object of the present invention is to prevent this clogging up of the goods in the hopper, and therefore the hopper is given a new form, making it wider at the bottom, the hopper looking like a reversed funnel.

One specific embodiment of such a new hopper is shown in the accompanying drawings.

*a* is a pulping-machine of any description, into which the paper-stock is conveyed by an endless traveling band into a conical hopper which tapers from its base upward. The material can be conveyed to the hopper in every possible way. If the transport is done by compressed air, the piping will enter the hopper a little lower on the side, and the regular cyclone might be put on top of the hopper to separate the air from the goods conveyed which have to settle down in the hopper.

The interior of the new hopper is provided with sprinkling-pipes to moisten the goods and lay the dust. The hopper is also provided with doors *e* and windows *f* to see the progress of the goods in the hopper.

It is clear that as the hopper is given such a form that the same is wider at its base a clogging of the material in the hopper is impossible.

Having now particularly described and ascertained the nature of my said invention and the manner in which the same is to be performed, I declare that what I claim is—

The combination with a pulping-machine, of a hopper therefor, said hopper being in the form of an inverted cone or pyramid, means for feeding material to said hopper, and spraying-pipes arranged in said hopper for moistening the material fed to the same.

In witness whereof I have hereunto set my hand in presence of two witnesses.

CASIMIR WURSTER.

Witnesses:
 HENRY HASPER,
 WOLDEMAR HAUPT.